United States Patent
Åström et al.

(10) Patent No.: US 10,425,969 B2
(45) Date of Patent: Sep. 24, 2019

(54) MECHANISMS FOR RANDOM ACCESS IN A NETWORK

(71) Applicant: Telefonaktiebolaget LM Ericsson (publ), Stockholm (SE)

(72) Inventors: Magnus Åström, Lund (SE); Pål Frenger, Linköping (SE); Bengt Lindoff, Bjärred (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/554,232

(22) PCT Filed: Aug. 10, 2017

(86) PCT No.: PCT/EP2017/070317
§ 371 (c)(1),
(2) Date: Aug. 29, 2017

(87) PCT Pub. No.: WO2019/029812
PCT Pub. Date: Feb. 14, 2019

(65) Prior Publication Data
US 2019/0053281 A1    Feb. 14, 2019

(51) Int. Cl.
*H04W 72/04* (2009.01)
*H04W 74/08* (2009.01)
(Continued)

(52) U.S. Cl.
CPC ... *H04W 74/0833* (2013.01); *H04W 56/0005* (2013.01); *H04W 56/0015* (2013.01); *H04W 72/0413* (2013.01); *H04W 74/008* (2013.01)

(58) Field of Classification Search
CPC ......... H04W 74/0833; H04W 56/0015; H04W 72/0413
See application file for complete search history.

(56) References Cited

U.S. PATENT DOCUMENTS

2017/0367120 A1* 12/2017 Murray ............... H04W 72/046
2018/0054837 A1*  2/2018 Islam ................ H04W 74/0833
(Continued)

FOREIGN PATENT DOCUMENTS

WO       2017074233 A1    5/2017
WO    WO-2018129123 A1 *  7/2018 ........... H04L 5/0091

OTHER PUBLICATIONS

Ericsson, "Higher Layer Implications of Beamforming During Random Access", 3GPP TSG-RAN WG2 Ad Hoc on NR, Ericsson, Tdoc R2-1707279, Qingdao, P.R. of China, Jun. 27-29, 2017, 5 pages.

(Continued)

*Primary Examiner* — Hassan Kizou
*Assistant Examiner* — Mahbubul Bar Chowdhury
(74) *Attorney, Agent, or Firm* — Murphy, Bilak & Homiller, PLLC (57) ABSTRACT

There is provided mechanisms for performing random access in a network. A method is performed by a terminal device and a method is performed by a network node. The terminal device method comprises decoding a time index from received system information. The system information is transmitted with a first symbol duration from a network node and is received by the terminal device at a first time instant. The method comprises determining a second symbol duration from the system information. The method comprises determining a second time instant, in relation to the first time instant, based on the time index, the second symbol duration, and a first receiver parameter. The method comprises transmitting a random access preamble at the second time instant.

25 Claims, 5 Drawing Sheets

(51) Int. Cl.
    *H04W 56/00*    (2009.01)
    *H04W 74/00*    (2009.01)

(56) References Cited

U.S. PATENT DOCUMENTS

| | | | |
|---|---|---|---|
| 2018/0084593 A1* | 3/2018 | Chen | H04W 76/11 |
| 2018/0160453 A1* | 6/2018 | Lee | H04W 72/04 |
| 2018/0167979 A1* | 6/2018 | Guo | H04W 16/28 |
| 2018/0192443 A1* | 7/2018 | Novlan | H04W 74/006 |
| 2018/0198659 A1* | 7/2018 | Ko | H04L 5/005 |
| 2018/0220450 A1* | 8/2018 | Aiba | H04W 74/004 |

OTHER PUBLICATIONS

Zaidi, Ali A. et al., "Waveform and Numerology to Support 5G Services and Requirements", IEEE Communications Magazine, vol. 54, Issue 11, Nov. 2016, 1-9.

* cited by examiner

MECHANISMS FOR RANDOM ACCESS IN A NETWORK

TECHNICAL FIELD

Embodiments presented herein relate to a method, a terminal device, a computer program, and a computer program product for performing random access in a network. Embodiments presented herein further relate to a method, a network node, a computer program, and a computer program product for enabling random access in a network.

BACKGROUND

In communications networks, there may be a challenge to obtain good performance and capacity for a given communications protocol, its parameters and the physical environment in which the communications network is deployed.

For example, one parameter in providing good performance and capacity for a given communications protocol in a communications network is the ability to perform efficient network access. In general terms, in order for a terminal device to obtain successful network access to a cellular network, such as a Long Term Evolution (LTE) based communications network, the terminal device first needs to find a cell, perform a time and frequency synchronization and read system information. As an example, the initial network access procedure as performed by the terminal device in LTE can be summarized in the following five steps: (1) the terminal device detects the Primary Synchronization Signal (PSS) transmitted by the network node (denoted eNB in LTE), whereby the local oscillator in the terminal device is adjusted to the frequency of the network node, and timing on an orthogonal frequency-division multiplexing (OFDM) symbol level, (2) the terminal device detects the Secondary Synchronization Signal (SSS), providing the eNB Cell ID and frame timing, (3) the terminal device decodes a Physical Broadcast Channel (PBCH), providing Master Information Block (MIB) data comprising information such as cell downlink bandwidth, configuration on a Physical Hybrid-ARQ Indicator Channel (PHICH), where ARQ is short for automatic repeat request, which allows the Physical Downlink Control Channel (PDCCH) to be read, and System frame Number (SFN), (4) the terminal device decodes the PDCCH channel in order to determine which resource blocks (RBs) on a Physical Downlink Shared Channel (PDSCH) contains System Information Block (SIB) information, and (5) the terminal device decodes the PDSCH resource blocks containing the SIB information (such as cell operator, uplink bandwidth and power control, and random access information).

The above disclosed initial network access procedure enables the terminal device to receive information that is needed for the terminal device for establishing an operational connection to the network node. In order to establish an operational connection to the network node, the terminal device performs a random access procedure. As an example, the random access procedure as performed by the terminal device in LTE can be summarized in the following four steps: (1) the terminal device transmits a Random Access Preamble on a Physical Random Access Channel (PRACH) in a PRACH resource and using information in System Information Block 2 (SIB2), allowing the network node to estimate timing of the terminal device, thus enabling timing alignment, (2) the terminal device receives a Random Access Response (on the PDSCH channel) instructing the terminal device to modify its uplink timing, receive a Temporary Cell Radio Network Temporary Identifier (T-CRNTI), and be allocated uplink resources to be used for step 3, (3) the terminal device transmits its identity (on a Physical Uplink Shared Channel (PUSCH)), and (4) the terminal device receives a Contention Resolve Message (on the PDSCH channel), in case multiple terminal devices use the same PRACH resource.

In order to support high carrier frequencies, such as up to 100 GHz, a fifth generation (5G) communications network, called New Radio or NR by 3GPP, is under development. It is assumed that antenna beamforming will be used in such communications network. By using beamforming, the network node (denoted gNB in NR) is able to concentrate energy into certain directions, thereby having a further reach than what would otherwise be possible.

Figure 1:
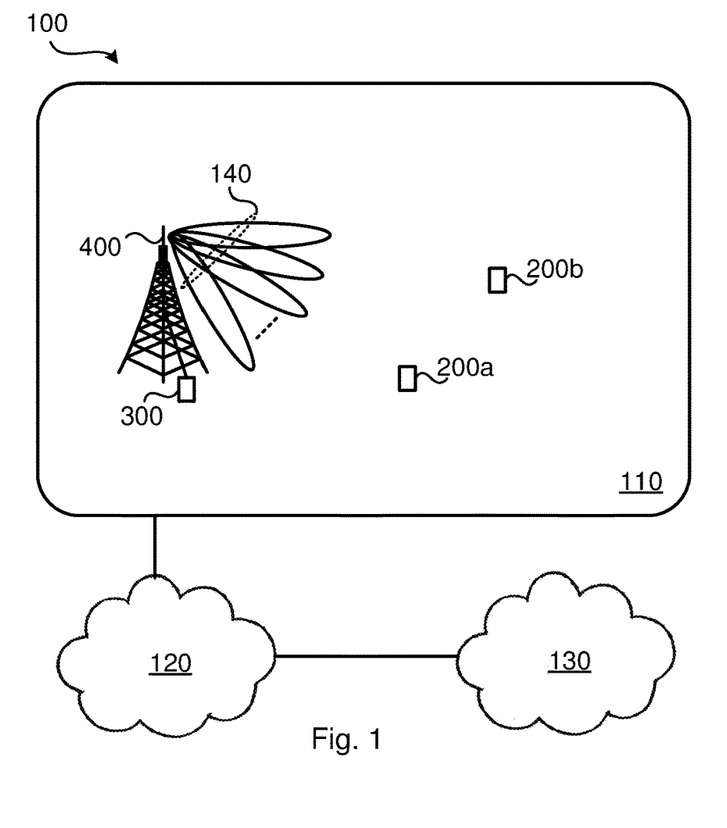
FIG. 1 is a schematic diagram illustrating a communications network according to embodiments.

FIG. 1 is a schematic diagram illustrating a communications network 100. The communications network 100 comprises a network node 300 that is configured to provide network access to terminal devices 200a, 200b in a radio access network 110. The radio access network 110 is operatively connected to a core network 120. The core network 120 is in turn operatively connected to a service network 130, such as the Internet. The terminal device 200a is thereby, via the network node 300, enabled to access services of, and exchange data with, the service network 130. The network node 300 provides network access in the radio access network 110 by transmitting signals to, and receiving signals from, the terminal devices 200a, 200b in beams 140. The beams 140 will thus be used to transmit and receive data in different directions. The signals could be transmitted from, and received by, a transmission and reception point (TRP) 400 of the network node 300. The TRP 400 could form an integral part of the network node 300 or be physically separated from the network node 300.

Examples of network nodes 300 are radio access network nodes, radio base stations, base transceiver stations, Node Bs, evolved Node Bs, g Node Bs, access points, and access nodes. Examples of terminal devices 200a, 200b are wireless devices, mobile stations, mobile phones, handsets, wireless local loop phones, user equipment (UE), smartphones, laptop computers, tablet computers, network equipped sensors, network equipped vehicles, and so-called Internet of Things devices.

The beams 140 could be used to carry system synchronization signals and system information. As mentioned above, synchronization signals are divided into primary and secondary synchronization signals, PSS, SSS, respectively, and system information is transmitted in both PSS and SSS and in the PBCH channel. In some aspects, these signals together comprise a synchronization signal block (SSB). Further system information may be conveyed in the PDSCH channel.

Figure 2:
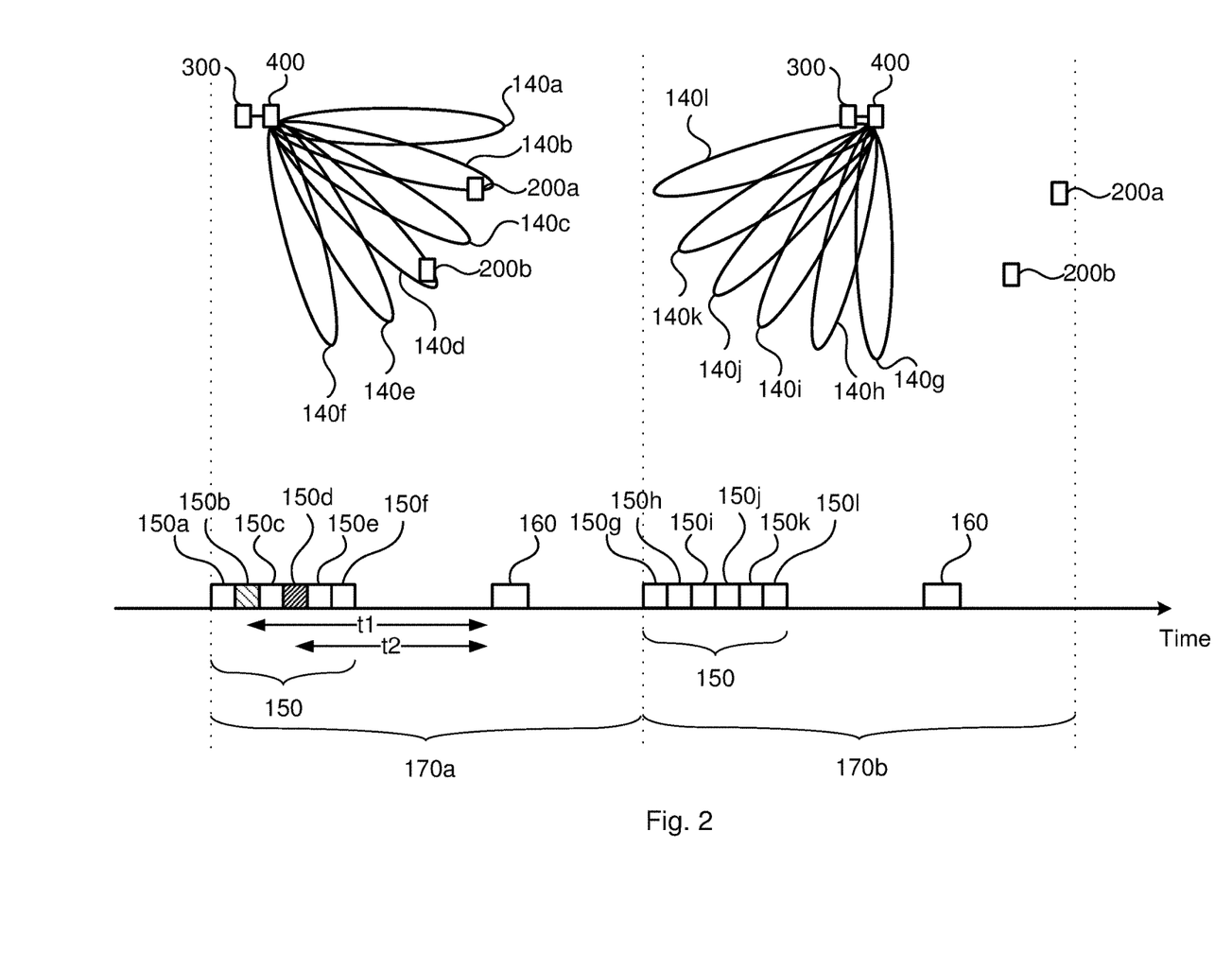
FIG. 2 is a schematic illustration of system information transmission in a network according to embodiments.

FIG. 2 schematically illustrates an example of SSB transmission in a communications network 100 using antenna beamforming at the network node 300. As described above, the SSB is transmitted in beams 140a-140l in different directions from the network node 300. As in the example of FIG. 2 it could be that not all beams 140a-140l are swept within one synchronization burst set. Particularly, according to the illustrative example of FIG. 2 the network node 300, via the TRP 400, transmits SSBs 150a-150l in two synchronization signal bursts 150 within a respective synchronization burst set 170a, 170b. Beams 140a-140f are swept within a first synchronization burst set 170a and beams 140g-140l are swept within a second synchronization burst set 170b. Each SSBs 150a-150l is transmitted in a respective one of the beams 140a-140l. For simplicity, but without loss of generality, it is assumed that SSBs 150*x* is transmitted in beam 140*x*, where x=a, b, c, . . . l.

Depending on the location of the terminal device 200*a*, 200*b*, a terminal device 200*a*, 200*b* could be able to find system information in the SSB of the beam 140*a*-140*l* that could serve the terminal device 200*a*, 200*b*. To each synchronization signal burst 150 there is (at least) one RACH occasion 160 in which a terminal device 200*a*, 200*b* receiving one of the SSBs, is assumed to transmit a random access preamble in order to establish an operational connection to the network node 300.

According to the illustrative example of FIG. 2, terminal device 200*a* receives SSB 150*b* in beam 140*b* and terminal device 200*b* receives SSB 150*d* in beam 140*d*. Although terminal devices 200*a*, 200*b* thus receive the system information in different SSBs they are still assumed to transmit a respective random access preamble within the same RACH occasion 160. However, since the same system information is provided in each SSB, the distance (t1 and t2, respectively for terminal devices 200*a*, 200*b* in FIG. 2) to the RACH occasion 160 is not known.

One way to resolve this could be for the network node 300 to, in each synchronization burst set 170*a*, 170*b*, explicitly signal when the RACH occasion 160 occurs, but such signalling could create a large overhead and it could still be difficult for the terminal devices 200*a*, 200*b* to find the RACH occasion 160.

In view of the above, there is a need for an improved random access procedure in the network 100.

SUMMARY

An object of embodiments herein is to provide mechanisms for efficient random access in a network.

According to a first aspect there is presented a method for performing random access in a network. The method is performed by a terminal device. The method comprises decoding a time index from received system information. The system information is transmitted with a first symbol duration from a network node and is received by the terminal device at a first time instant. The method comprises determining a second symbol duration from the system information. The method comprises determining a second time instant, in relation to the first time instant, based on the time index, the second symbol duration, and a first receiver parameter. The method comprises transmitting a random access preamble at the second time instant.

According to a second aspect there is presented a terminal device for performing random access in a network. The terminal device comprises processing circuitry. The processing circuitry is configured to cause the terminal device to decode a time index from received system information. The system information is transmitted with a first symbol duration from a network node and is received by the terminal device at a first time instant. The processing circuitry is configured to cause the terminal device to determine a second symbol duration from the system information. The processing circuitry is configured to cause the terminal device to determine a second time instant, in relation to the first time instant, based on the time index, the second symbol duration, and a first receiver parameter. The processing circuitry is configured to cause the terminal device to transmit a random access preamble at the second time instant.

According to a third aspect there is presented a terminal device for performing random access in a network. The terminal device comprises: processing circuitry and a storage medium. The storage medium stores instructions that, when executed by the processing circuitry, cause the terminal device to perform operations, or steps. The operations, or steps, cause the terminal device to decode a time index from received system information. The system information is transmitted with a first symbol duration from a network node and is received by the terminal device at a first time instant. The operations, or steps, cause the terminal device to determine a second symbol duration from the system information. The operations, or steps, cause the terminal device to determine a second time instant, in relation to the first time instant, based on the time index, the second symbol duration, and a first receiver parameter. The operations, or steps, cause the terminal device to transmit a random access preamble at the second time instant.

According to a fourth aspect there is presented a terminal device for performing random access in a network. The terminal device comprises a decode module configured to decode a time index from received system information. The system information is transmitted with a first symbol duration from a network node and is received by the terminal device at a first time instant. The terminal device comprises a determine module configured to determine a second symbol duration from the system information. The terminal device comprises a determine module configured to determine a second time instant, in relation to the first time instant, based on the time index, the second symbol duration, and a first receiver parameter. The terminal device comprises a transmit module configured to transmit a random access preamble at the second time instant.

According to a fifth aspect there is presented a computer program for performing random access in a network. The computer program comprises computer program code which, when run on processing circuitry of a terminal device, causes the terminal device to perform a method according to the first aspect.

According to a sixth aspect there is presented a method for enabling random access in a network. The method is performed by a network node. The method comprises transmitting system information in the network. The system information is transmitted with a first symbol duration and comprises a time index and information representing a second symbol duration. The method comprises receiving a random access preamble at a second time instant in relation to the first time instant. The random access preamble is received from a terminal device having received the transmitted system information. The second time instant is based on the first time instant, the time index, the second symbol duration, and a first receiver parameter.

According to a seventh aspect there is presented a network node for enabling random access in a network. The network node comprises processing circuitry. The processing circuitry is configured to cause the network node to transmit system information in the network. The system information is transmitted with a first symbol duration and comprises a time index and information representing a second symbol duration. The processing circuitry is configured to cause the network node to receive a random access preamble at a second time instant in relation to the first time instant. The random access preamble is received from a terminal device having received the transmitted system information. The second time instant is based on the first time instant, the time index, the second symbol duration, and a first receiver parameter.

According to an eighth aspect there is presented a network node for enabling random access in a network. The network node comprises processing circuitry and a storage medium.

The storage medium stores instructions that, when executed by the processing circuitry, cause the network node to perform operations, or steps. The operations, or steps, cause the network node to transmit system information in the network. The system information is transmitted with a first symbol duration and comprises a time index and information representing a second symbol duration. The operations, or steps, cause the network node to receive a random access preamble at a second time instant in relation to the first time instant. The random access preamble is received from a terminal device having received the transmitted system information. The second time instant is based on the first time instant, the time index, the second symbol duration, and a first receiver parameter.

According to a ninth aspect there is presented a network node for enabling random access in a network. The network node comprises a transmit module configured to transmit system information in the network. The system information is transmitted with a first symbol duration and comprises a time index and information representing a second symbol duration. The network node comprises a receive module configured to receive a random access preamble at a second time instant in relation to the first time instant. The random access preamble is received from a terminal device having received the transmitted system information. The second time instant is based on the first time instant, the time index, the second symbol duration, and a first receiver parameter.

According to a tenth aspect there is presented a computer program for enabling random access in a network, the computer program comprising computer program code which, when run on processing circuitry of a network node, causes the network node to perform a method according to the sixth aspect.

According to an eleventh aspect there is presented a computer program product comprising a computer program according to at least one of the fifth aspect and the tenth aspect and a computer readable storage medium on which the computer program is stored. The computer readable storage medium could be a non-transitory computer readable storage medium.

Advantageously these methods, these terminal devices, these network nodes, and these computer programs provide efficient random access for the terminal device in the network.

Advantageously these methods, these terminal devices, these network nodes, and these computer programs enable the number of bits needed to represent the time index to be kept to a minimum.

Further advantages will be presented at appropriate places in the detailed description.

It is to be noted that any feature of the first, second, third, fourth, fifth, sixth seventh, eight, ninth, tenth and eleventh aspects may be applied to any other aspect, wherever appropriate. Likewise, any advantage of the first aspect may equally apply to the second, third, fourth, fifth, sixth, seventh, eight, ninth, tenth, and/or eleventh aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

As disclosed above, it could be difficult for the terminal devices 200a, 200b to find the RACH occasion 160.

In further detail, it is envisioned that communications networks could be developed for maximum flexibility to support multiple, and substantially different, use cases. Non-limiting examples of such use cases are mobile broadband communication, machine type communication (MTC), ultra reliable low latency communications (URLLC), sidelink device-to-device (D2D) communications, etc. In addition to that, it is envisioned that communications networks could support carrier frequencies from sub-GHz to 100 GHz. All these requirements put requirements on system design, for example requiring that different numerologies must be supported. In some aspects numerology refers to waveform parametrization, e.g., cyclic prefix (CP), subcarrier spacing (SCS), sample rates, etc. in OFDM-based communications networks, see "Waveform and Numerology to Support 5G Services and Requirements" by Ali A. Zaidi et al in IEEE Communications Magazine, Volume 54, Issue 1, Pages 90-98, 15 Nov. 2016.

Subcarrier spacing generally refers to the spectral distance between the sub-carriers (Resource Elements) in an OFDM signal. This parameter determines the sensitivity to coherence time in terms of samples and sub-carriers. This, in turn, determines sensitivity to Doppler spread, and different radio propagation channel environments. It is envisioned that SCSs should be accepted, e.g., 15 kHz, 30 kHz, 60 kHz, 120 kHz and 240 kHz. Typically, lower SCSs could be used at lower carrier frequencies and higher SCSs at higher frequencies. Furthermore, the SCS also has an impact on the symbol time length. For instance, if the SCS is 15 kHz, one OFDM symbol (excluding the CP) is 1/15kHz=66.67 microseconds, while an OFDM symbol where the SCS is 30 kHz has half that symbol time, i.e. 1/30kHz=33.33 microseconds. Hence, the SCS has an impact of the symbol sample rate as well.

It is envisioned that a similar structure for the initial access procedure and the random access procedure as disclosed above could be used. That is, PSS is transmitted in order to provide timing information and a rough frequency calibration, SSS is transmitted in order to provide cell or beam ID information and a finer frequency calibration, and information transmitted on the PBCH channel provides information for the terminal device 200a, 200b to be able to perform a random access procedure. For complexity reasons in the terminal device 200a, 200b, the SSB could be transmitted with fewer SCS alternatives than those outlined above, for example with a 30 kHz sub-carrier spacing below 6 GHz and 120 or 240 kHz sub-carrier spacing above 6 GHz.

Existing mechanisms, e.g., in LTE, for determining the PRACH timing, and thus when the next RACH occasion occurs, assumes a fixed numerology (i.e. one single SCS, and hence fixed OFDM symbol time) and a synchronization signal that is transmitted at the same time throughout the cell.

As explained above, due to beamforming, terminal devices 200a, 200b at different positions will receive the SSB at different instants (i.e., in different beams 140a-140l), whereas all terminal devices 200a, 200b are expected to transmit the random access preamble at the same time.

In view of the above some signaling could be introduced in order to handle scenarios in which beam timing differences occur. However, in some situations mixed numerologies are used and it could therefore be challenging to design such signaling.

It is therefore one purpose of the herein disclosed embodiments to enable random access in a network 100 with the signalling of the time index as efficient as possible (i.e., with as few bits as possible), in order to reduce signaling overhead.

The embodiments disclosed herein particularly relate to mechanisms for performing random access in a network 100 and enabling random access in a network 100. In order to obtain such mechanisms there is provided a terminal device 200a, a method performed by the terminal device 200a, a computer program product comprising code, for example in the form of a computer program, that when run on processing circuitry of the terminal device 200a, causes the terminal device 200a to perform the method. In order to obtain such mechanisms there is further provided a network node 300, a method performed by the network node 300, and a computer program product comprising code, for example in the form of a computer program, that when run on processing circuitry of the network node 300, causes the network node 300 to perform the method.

The methods disclosed herein provide efficient signalling of the time index and allows the time index to be determined with only a minimum signaling overhead in networks 100 with mixed numerologies and/or in beam based networks 100.

Figure 3:
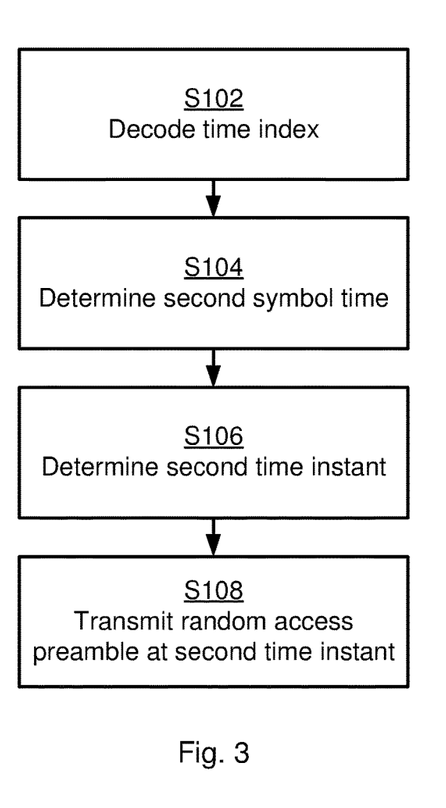
FIGS. 3 and 4 are flowcharts of methods according to embodiments.

Reference is now made to FIG. 3 illustrating a method for performing random access in a network 100 as performed by the terminal device 200a according to an embodiment.

As will be disclosed below, the network node 300 transmits system information with a first symbol duration. It is assumed that the system information is received by the terminal device 200a. Particularly, the terminal device 200a is configured to perform step S102:

S102: The terminal device 200a decodes a time index from received system information. The system information was transmitted with a first symbol duration from the network node 300. In some aspects the first symbol duration represents the symbol length used by the network node 300. The system information is received by the terminal device 200a at a first time instant.

The system information is used by the terminal device 200a to determine a second symbol duration. In some aspects the second symbol duration represents the symbol length used by the terminal device 200a. Particularly, the terminal device 200a is configured to perform step S104:

S104: The terminal device 200a determines a second symbol duration from the system information.

Examples of how to determine the second symbol duration from the system information will be disclosed below. Further, the terminal device 200a still does not know when to transmit the random access preamble. Therefore the terminal device 200a is configured to perform step S106:

S106: The terminal device 200a determines a second time instant, in relation to the first time instant, based on the time index, the second symbol duration, and a first receiver parameter. Since the second time instant is determined in relation to the first time instant, the second time instant implicitly is based also on the first time instant. Examples of how these parameters can be used by the terminal device 200a to determine the second time instant will be disclosed below. In some aspects the second time instant defines the absolute point in time when the random access preamble should be transmitted.

Since the second time instant is determined not only from the time index, the number of bits needed to represent the time index can be minimized, for example allowing two or more system information transmissions 150a-150f, 150g-150l within a synchronization burst set 170a, 170b to have the same value of the time index, resulting in a minimum signaling overhead for including the time index in the system information.

The terminal device 200a now has sufficient information for transmitting the random access preamble. Thus, the terminal device 200a is configured to perform step S108:

S108: The terminal device 200a transmits a random access preamble at the second time instant.

The transmission of the random access preamble enables the network node 300 to detect presence of the terminal device 200a and to correct for the channel latency between the terminal device 200a and the network node 300. Once presence of the terminal device 200a has been detected (and the channel latency corrected for) an operation connection can be established between the network node 300 and the terminal device 200a.

Embodiments relating to further details of performing random access in a network 100 as performed by the terminal device 200a will now be disclosed.

There could be different ways for the terminal device 200a to transmit the random access preamble. According to an embodiment the random access preamble is transmitted on the PRACH channel.

There could be different ways in which the terminal device 200a receives the system information. In some aspects the system information is received in an SSB. Thus, according to an embodiment the system information is (by the network node 300) transmitted in a synchronization block. The synchronization block could comprise PSS, SSS, and PBCH signals (i.e. signals of the PBCH channel). In other aspects the system information is received on the PDSCH. Particularly, according to an embodiment the system information is transmitted (by the network node 300) as remaining system information (RMSI) in the PDSCH channel. In yet other aspects the system information is shared between the PBCH and the PDSCH such that the minimum system information (such as MSI or MIB) is transmitted in the PBCH and RMSI in the PDSCH.

In some aspects the time index determines the distance from the detected SSB to the next RACH occasion. Particularly, according to an embodiment the second symbol duration corresponds to a symbol length of symbols transmitted by the terminal device 200a, and the time index indicates distance, in terms of integers of the symbol length, between the first time instant and the second time instant.

In some aspects the time index changes by every SSB within a synchronization signal burst 150. As will be disclosed in more detail below with reference to FIG. 5, the most efficient way to represent the time index differs depending on the SSB numerology in the downlink and the numerology of the uplink.

Aspects of how to determine the second symbol duration from the system information will now be disclosed. According to an embodiment the second symbol duration is specified in the the system information. Thus, the second symbol duration could be determined from the SSB, PBCH signals, or RMSI.

Aspects of the first receiver parameter will now be disclosed. In some aspects the first receiver parameter is an integer multiple of the first symbol duration. That is, according to an embodiment the first symbol duration corresponds to a symbol length of symbols transmitted by the network node 300, and the first receiver parameter is an integer multiple of the symbol length. Further, in some aspects the first receiver parameter is the first symbol duration. That is, according to an embodiment the first receiver parameter equals the first symbol duration. Further, in some aspects the first receiver parameter equals the timewise length of the synchronization block.

Aspects of how to determine the second time instant will now be disclosed. In general terms, having determined the uplink symbol length (or equivalently the uplink SCS) as defined by the second symbol duration the terminal device 200a could determine the delay between the reception of the system information and the transmission of the random access preamble, based the SCS for the downlink (which is known by the terminal device 200a, since the system information has been decoded), the determined SCS to use for the transmission of the random access preamble, and the time index, using the knowledge of minimal bit representation of the time index. Particularly, according to an embodiment the second time instant is determined so as to occur the above disclosed integer symbol lengths past the first time instant.

In further aspects, the second time instant is determined from at least the time index and the maximum symbol duration of symbols with a first and a second sub-carrier spacing. Particularly, according to an embodiment the second time instant is determined based on the time index and the largest of the first symbol duration and the second symbol duration. Further, the second time instant could be based on a relation between the SSB duration and the uplink symbol time. In this respect, the SSB duration might be longer than the uplink symbol time, whilst still the downlink symbol time is shorter.

In further aspects, the second time instant is determined by selecting the maximum symbol length of the system information and the symbol length used for transmitting the random access preamble and multiplying that symbol length with the time index. Particularly, according to an embodiment, determining the second time comprises multiplying the largest of the first symbol duration and the second symbol duration with the time index.

Some communications network such as OFDM-based communications networks, are based on the use of so-called cyclic prefixes. The term cyclic prefix generally refers to the prefixing of a symbol with a repetition of the end. In further aspects, a cyclic prefix length is therefore added to the maximum symbol duration. That is, according to an embodiment, determining the second time comprises adding a cyclic prefix length to the largest of the first symbol duration and the second symbol duration before performing the above defined multiplying.

In further aspects an additional delay term, below denoted Δ, is used when determining the second time instant. That is, according to an embodiment the second time instant further is based on a delay term.

Furthermore, the value of the delay term may be dependent on the PRACH SCS, or the PRACH/SSB SCS relation (or PRACH SCS/SSB SCS and symbol length relation) and hence implicitly determined by the terminal device 200a, or explicitly signaled in the PRACH or in another information block.

In some aspects the additional delay term is added to the second time instant. That is, according to an embodiment the delay term is added to the second time instant as determined based on the first time instant, the time index, and the second symbol duration. In other words, to the second time instant as determined based on the first time instant, the time index, and the second symbol duration is added the delay term.

The delay term could either be explicitly signaled by the network node 300 or implicitly determined by the terminal device 200a. In some aspects the additional delay term is dependent on either the first symbol duration, or the second symbol duration, or both these symbol durations. That is, according to an embodiment the delay term depends on at least one of the first symbol duration and the second symbol duration. In some aspects the additional delay term is read from the PBCH or the RMSI. That is, according to an embodiment the delay term is specified in the PBCH signals or in the RMSI.

Figure 4:
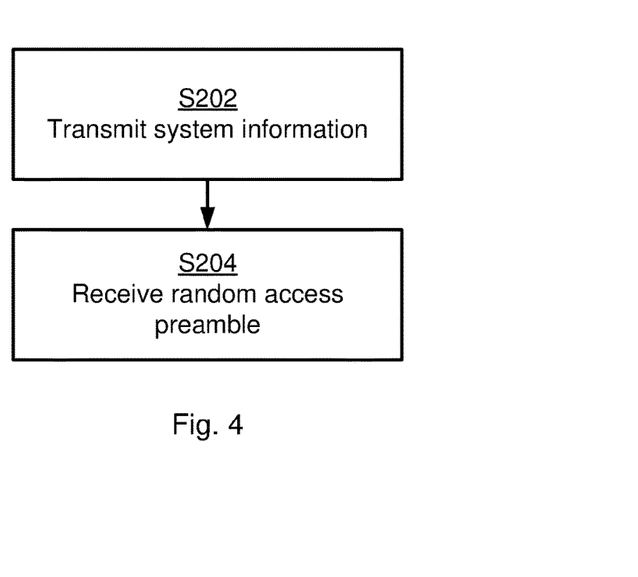

Reference is now made to FIG. 4 illustrating a method for enabling random access in a network 100 as performed by the network node 300 according to an embodiment.

The network node 300 is assumed to transmit system information in the network 100 in order to enable random access for the terminal device 200a. Therefore the network node 300 is configured to perform step S202:

S202: The network node 300 transmits system information in the network 100. The system information is transmitted with a first symbol duration. The system information comprises a time index and information representing a second symbol duration.

As disclosed above, the terminal device 200a is assumed to respond to the network node 300 by transmitting a random access preamble. Thus, the network node 300 is configured to perform step S204:

S204: The network node 300 receives a random access preamble at a second time instant in relation to the first time instant. The random access preamble is received from the terminal device 200a. As disclosed above, the terminal device 200a has received the transmitted system information. As further disclosed above, the second time instant is based on the first time instant, the time index, the second symbol duration, and the first receiver parameter.

As disclosed above, transmission of the random access preamble enables the network node 300 to detect presence of the terminal device 200a and correct for channel latency. Thus, upon reception of the random access preamble the network node 300 detects presence of the terminal device 200a and corrects for any channel latency. In more detail, the network node 300 uses the preamble to adjust the timing offset (path delay) between the terminal device 200a and the network node 300 and configures the terminal device 200a to transmits its symbols synchronized with other terminal devices 200 to (at least) within the cyclic prefix length (if used).

Embodiments relating to further details of enabling random access in a network 100 as performed by the network node 300 will now be disclosed.

As disclosed above, in some aspects the system information is (by the terminal device 200a) received in an SSB. Thus, according to an embodiment the system information is transmitted in a synchronization block.

As disclosed above, the synchronization block could comprise PSS, SSS, and PBCH signals (i.e. signals of the PBCH channel). In other aspects the system information is transmitted on the PDSCH. Particularly, according to an embodiment the system information is transmitted (by the network node 300) as RMSI) in the PDSCH channel.

As disclosed above, in some aspects the additional delay term is explicitly signaled by the network node 300. That is, according to an embodiment the delay term is (by the network node 300) specified in the PBCH signals or in the RMSI.

As disclosed above, there could be different ways for the terminal device 200a to transmit the random access preamble, and according to an embodiment the random access preamble is (by the terminal device 200a) transmitted on the PRACH channel Thus, according to an embodiment the random access preamble is (by the network node 300) received on the PRACH channel.

For illustrative purposes, but without loss of generality, it is assumed that each SSB occupies at least 1 OFDM symbol. Particularly, in the illustrative examples of FIGS. 5(a) and 5(b) each SSB occupies 4 OFDM symbols, whereas each RACH occasion is assumed to occupy 1 OFDM symbol and in the illustrative example of FIG. 5(c) each SSB occupies 4 OFDM symbols and each RACH occasion is also assumed to occupy 1 OFDM symbol. In any case, the OFDM symbols could have different duration in downlink and uplink, respectively depending on the numerology of the downlink and the numerology of the uplink. In some aspects the representation of the time index therefore depends on the numerology of the downlink and the numerology of the uplink. Particularly, according to an embodiment the first symbol duration corresponds to a first sub-carrier spacing and the second symbol duration corresponds to a second sub-carrier spacing, and the time index depends on the first sub-carrier spacing and the second sub-carrier spacing or on a relation between the first sub-carrier spacing and the second sub-carrier spacing.

For coverage reasons the different SSBs 150a-150l are assumed not to overlap. Therefore, the time index for beams 140a-140l comprising SSBs longer than 1 OFDM symbol needs not to have a resolution more accurately than on an SSB basis. This allows the number of bits needed to represent the time index to be reduced if represented by the downlink numerology. Thus, in some aspects the time index changes by every SSB within a synchronization signal bursts 150. Particularly, according to an embodiment the system information is transmitted as part of a burst of system information transmissions (such as in a synchronization signal bursts 150), and the time index depends on where in this burst the system information is transmitted. In some cases, two SSBs 150a-150l per slot are transmitted, resulting in non-equidistant SSBs. In such case the indexing could be performed on half slot basis, compensating for the different positions of the SSBs.

In some aspects each system information transmission within the burst is in its own beam 140a-140l. Particularly, according to an embodiment each system information transmission within the burst 150 is transmitted in its own beam 140a-140l. When the system information is transmitted in a beam 140a-140l the system information could comprise a beam index in which the position of the system information transmission within the burst is revealed.

All system information transmissions within one and the same synchronization signal burst 150 are associated with one and the same RACH occasion 160 within its respective synchronization burst set 170a, 170b. One such RACH occasion 160 is thus located between two such synchronization signal bursts 150.

Figure 5:
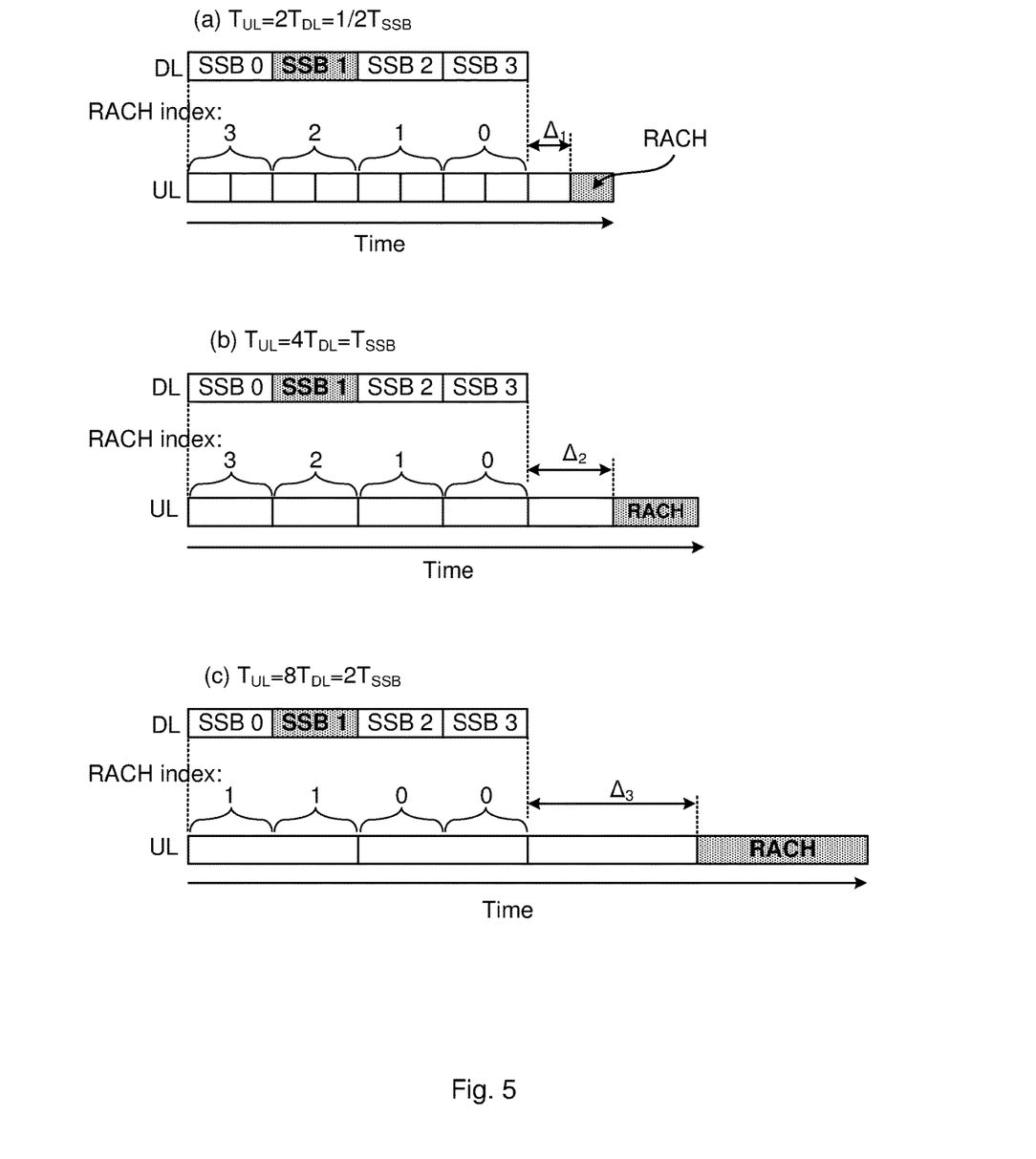
FIG. 5 is a schematic illustration of example relations between transmitted time index and RACH occasion according to embodiments.

FIG. 5 schematically illustrates downlink (DL) and uplink (UL) symbol lengths, and particularly the DL SSB length and the UL symbol length. The downlink and uplink symbol lengths are illustrated for a network using mixed numerologies (such as different SCS in uplink and downlink, respectively). In the illustrative example of FIG. 5 it is assumed that the system information is transmitted in SSBs in the downlink. FIG. 5 illustrates at (a), (b), and (c) three possible example relations between the transmitted time index and the RACH occasion in the uplink for different SCS relations between the transmitted system information (using the first symbol duration) and transmitting the random access preamble (using the second symbol duration) in the RACH occasion 160.

In some aspects there is a unique time index for each SSB within a burst 150. That is, according to an embodiment each system information transmission within the burst 150 has its own time index. FIGS. 5(a) and 5(b) give examples of this.

In FIG. 5(a), it is assumed that the downlink symbol length ($T_{DL}$) is half that of the uplink symbol time ($T_{UL}$) and the SSB length ($T_{SSB}$) is 4 downlink symbols long. This may for instance be the case if the SCS for the SSB is 30 kHz and the SCS for the RACH occasion is 15 kHz. In FIG. 5(a), it is evident that the time index should be incremented by one for each $T_{SSB}$, for minimal bit representation of the time index.

In FIG. 5(b), it is assumed that $T_{DL}$ is one quarter of $T_{UL}$ and $T_{SSB}$ is 4 downlink symbols long. Thus, $T_{SSB}=T_{UL}$ why the time index could depend on either $T_{SSB}$ or $T_{UL}$. This may for instance be the case if the SCS for the SSB is 120 kHz and the SCS for the RACH occasion is 30 kHz.

In some aspects the time index is shared between SSBs within a burst 150. That is, according to an embodiment at least two of the system information transmissions within the burst 150 share one and the same time index.

In FIG. 5(c), it is assumed that $T_{DL}$ is one eight of $T_{UL}$ and $T_{SSB}$ is 4 downlink symbols long; but still the DL SSB duration is compared to the UL symbol duration. Therefore, in comparison to FIGS. 5(a) and 5(b), in FIG. 5(c), the time index requires the least number of bits by depending on $T_{UL}$. This may for instance be the case if the SCS for the SSB is 120 kHz and the SCS for the RACH occasion is 15 kHz. Conversely, If $T_{DL}$ is one eight of $T_{UL}$ and $SCS_{UL}$ is 15 kHz, then $SCS_{DL}$ is 120 kHz (8×15 kHz). The same is true if $T_{DL}$ is one half of $T_{UL}$ and $T_{SSB}$ is 1 downlink symbol long. Since both SSB 0 and SSB 1 are given the same time index value, other system information is needed in order to resolve if their beam is the first beam 140a or the second beam 140b. This so-called other system information could be derived from e.g., the beam indexation.

Advantageously, by using the herein disclosed methods, the most efficient RACH index is always used irrespective of the numerology. Hence, the time index may be resolved using fewer bits than what would otherwise be the case.

Advantageously, by using the herein disclosed methods, there is provided efficient mechanisms for the terminal device 200a to determine the delay between the reception of the system information and the RACH occasion. This is especially advantageous in a mixed numerology network in which the system information may be transmitted with a first symbol duration (i.e. sub-carrier spacing) and the random access response is transmitted with a second symbol duration (i.e. sub-carrier spacing).

Advantageously, the herein disclosed mechanisms for performing random access and for enabling random access are efficient in the sense that minimal signalling overhead is required whilst maintaining network flexibility in terms of number of allowed downlink numerology and uplink numerology combinations.

Figure 6:
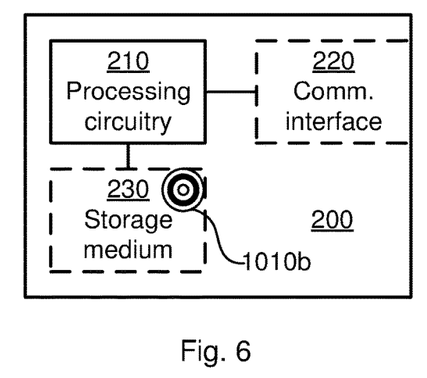
FIG. 6 is a schematic diagram showing functional units of a terminal device according to an embodiment.

FIG. 6 schematically illustrates, in terms of a number of functional units, the components of a terminal device 200a according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1010a (as in FIG. 10), e.g. in the form of a storage medium 230. The processing circuitry 210 may further be provided as at least one application specific integrated circuit (ASIC), or field programmable gate array (FPGA).

Particularly, the processing circuitry 210 is configured to cause the terminal device 200a to perform a set of operations, or steps, S102-S108, as disclosed above. For example, the storage medium 230 may store the set of operations, and the processing circuitry 210 may be configured to retrieve the set of operations from the storage medium 230 to cause the terminal device 200a to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The terminal device 200a may further comprise a communications interface 220 for communications with other entities, nodes, functions, and devices in the communications network 100, such as the network node 300. As such the communications interface 220 may comprise one or more transmitters and receivers, comprising analogue and digital components.

The processing circuitry 210 controls the general operation of the terminal device 200a e.g. by sending data and control signals to the communications interface 220 and the storage medium 230, by receiving data and reports from the communications interface 220, and by retrieving data and instructions from the storage medium 230. Other components, as well as the related functionality, of the terminal device 200a are omitted in order not to obscure the concepts presented herein.

Figure 7:
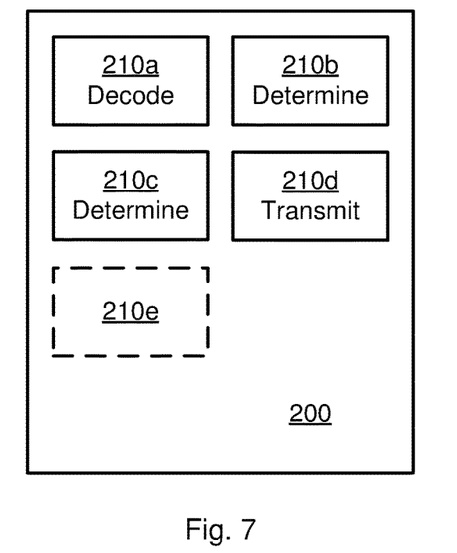
FIG. 7 is a schematic diagram showing functional modules of a terminal device according to an embodiment.

FIG. 7 schematically illustrates, in terms of a number of functional modules, the components of a terminal device 200a according to an embodiment. The terminal device 200a of FIG. 7 comprises a number of functional modules; a decode module 210a configured to perform step S102, a determine module 210b configured to perform step S104, a determine module 210c configured to perform step S106, and a transmit module 210d configured to perform step S108. The decode module 210a is configured to decode a time index from received system information, the system information being transmitted with a first symbol duration from the network node 300 and being received by the terminal device 200a at a first time instant. The determine module 210b is configured to determine a second symbol duration from the system information. The determine module 210c is configured to determine a second time instant, in relation to the first time instant, based on the time index, the second symbol duration, and a first receiver parameter. The transmit module 210d is configured to transmit a random access preamble at the second time instant. The terminal device 200a of FIG. 7 may further comprise a number of optional functional modules, as represented by module 210e. In general terms, each functional module 210a-210e may be implemented in hardware or in software. Preferably, one or more or all functional modules 210a-210e may be implemented by the processing circuitry 210, possibly in cooperation with the communications interface 220 and/or the storage medium 230. The processing circuitry 210 may thus be arranged to fetch, from the storage medium 230, instructions as provided by a functional module 210a-210e and to execute these instructions, thereby performing any steps of the terminal device 200a as disclosed herein.

Figure 8:
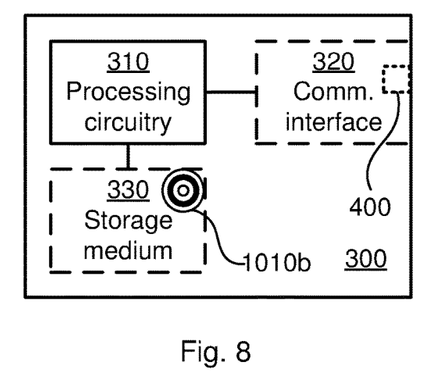
FIG. 8 is a schematic diagram showing functional units of a network node according to an embodiment.

FIG. 8 schematically illustrates, in terms of a number of functional units, the components of a network node 300 according to an embodiment. Processing circuitry 310 is provided using any combination of one or more of a suitable central processing unit (CPU), multiprocessor, microcontroller, digital signal processor (DSP), etc., capable of executing software instructions stored in a computer program product 1010b (as in FIG. 10), e.g. in the form of a storage medium 330. The processing circuitry 310 may further be provided as at least one application specific integrated circuit (ASIC), or field programmable gate array (FPGA).

Particularly, the processing circuitry 310 is configured to cause the network node 300 to perform a set of operations, or steps, S202-S204, as disclosed above. For example, the storage medium 330 may store the set of operations, and the processing circuitry 310 may be configured to retrieve the set of operations from the storage medium 330 to cause the network node 300 to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The network node 300 may further comprise a communications interface 320 for communications with other entities, nodes, functions, and devices in the communications network 100, such as the terminal device 200a. As such the communications interface 320 may comprise one or more transmitters and receivers, comprising analogue and digital components. In particular, the TRP 400 could be co-located, housed by, part of, or be an integral part of the communications interface 320.

The processing circuitry 310 controls the general operation of the network node 300 e.g. by sending data and control signals to the communications interface 320 and the storage medium 330, by receiving data and reports from the communications interface 320, and by retrieving data and instructions from the storage medium 330. Other components, as well as the related functionality, of the network node 300 are omitted in order not to obscure the concepts presented herein.

Figure 9:
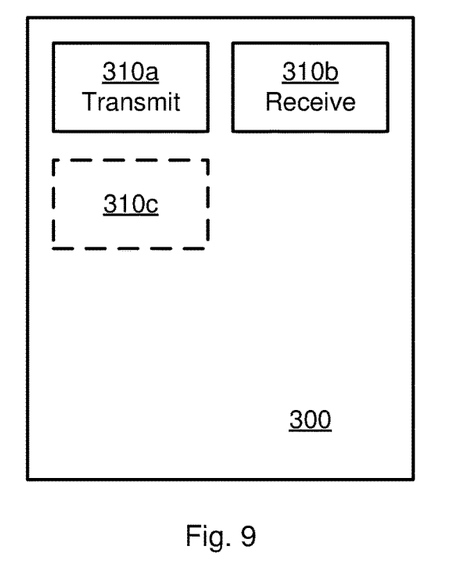
FIG. 9 is a schematic diagram showing functional modules of a network node according to an embodiment.

FIG. 9 schematically illustrates, in terms of a number of functional modules, the components of a network node 300 according to an embodiment. The network node 300 of FIG. 9 comprises a number of functional modules; a transmit module 310a configured to perform step S202, and a receive module 310b configured to perform step S204. The transmit module 310a is configured to transmit system information in the network 100, the system information being transmitted with a first symbol duration and comprising a time index and information representing a second symbol duration. The receive module 310b is configured to receive a random access preamble at a second time instant in relation to the first time instant, the random access preamble being received from a terminal device 200a having received the transmitted system information, the second time instant being based on the first time instant, the time index, the second symbol duration, and a first receiver parameter. The network node 300 of FIG. 9 may further comprise a number of optional functional modules, such as represented by module 310c. In general terms, each functional module 310a-310c may be implemented in hardware or in software. Preferably, one or more or all functional modules 310a-310c may be implemented by the processing circuitry 310, possibly in cooperation with the communications interface 320 and/or the storage medium 330. The processing circuitry 310 may thus be arranged to from the storage medium 330 fetch instructions as provided by a functional module 310a-310c and to execute these instructions, thereby performing any steps of the network node 300 as disclosed herein.

The network node 300 may be provided as a standalone device or as a part of at least one further device. For example, the network node 300 may be provided in a node of the radio access network 110 or in a node of the core network 120. Alternatively, functionality of the network node 300 may be distributed between at least two devices, or nodes. These at least two nodes, or devices, may either be part of the same network part (such as the radio access network 110 or the core network 120) or may be spread between at least two such network parts. In general terms, instructions that are required to be performed in real time may be performed in a device, or node, operatively closer to the TRP 400 than instructions that are not required to be performed in real time.

Thus, a first portion of the instructions performed by the network node 300 may be executed in a first device, and a second portion of the of the instructions performed by the network node 300 may be executed in a second device; the herein disclosed embodiments are not limited to any particular number of devices on which the instructions performed by the network node 300 may be executed. Hence, the methods according to the herein disclosed embodiments are suitable to be performed by a network node 300 residing in a cloud computational environment. Therefore, although a single processing circuitry 310 is illustrated in FIG. 8 the processing circuitry 310 may be distributed among a plurality of devices, or nodes. The same applies to the functional modules 310a-310c of FIG. 9 and the computer program 1020b of FIG. 10 (see below).

Figure 10:
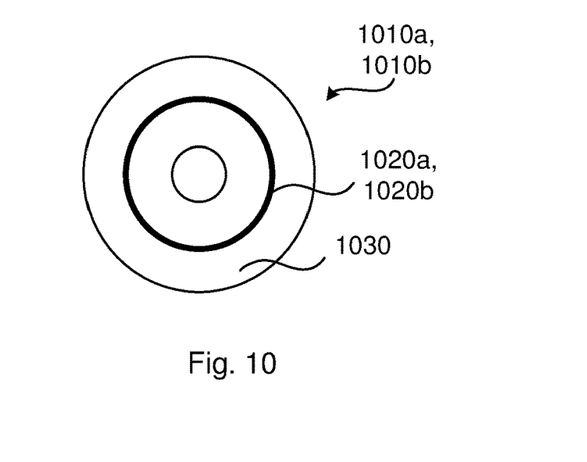
FIG. 10 shows one example of a computer program product comprising computer readable means according to an embodiment.

FIG. 10 shows one example of a computer program product 1010a, 1010b comprising computer readable means 1030. On this computer readable means 1030, a computer program 1020a can be stored, which computer program 1020a can cause the processing circuitry 210 and thereto operatively coupled entities and devices, such as the communications interface 220 and the storage medium 230, to execute methods according to embodiments described herein. The computer program 1020a and/or computer program product 1010a may thus provide means for performing any steps of the terminal device 200a as herein disclosed. On this computer readable means 1030, a computer program 1020b can be stored, which computer program 1020b can cause the processing circuitry 310 and thereto operatively coupled entities and devices, such as the communications interface 320 and the storage medium 330, to execute methods according to embodiments described herein. The computer program 1020b and/or computer program product 1010b may thus provide means for performing any steps of the network node 300 as herein disclosed.

In the example of FIG. 10, the computer program product 1010a, 1010b is illustrated as an optical disc, such as a CD (compact disc) or a DVD (digital versatile disc) or a Blu-Ray disc. The computer program product 1010a, 1010b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1020a, 1020b is here schematically shown as a track on the depicted optical disk, the computer program 1020a, 1020b can be stored in any way which is suitable for the computer program product 1010a, 1010b.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for performing random access in a network, the method being performed by a terminal device, the method comprising:
  receiving a Synchronization Signal Block (SSB) at a first time instant, the SSB having a time index denoting a timewise position of the SSB within a burst of successively transmitted SSBs and having an SSB length defined by a downlink symbol length that differs from an uplink symbol length indicated in system information included in or transmitted in association with the SSB, wherein the time index is an integer value;
  computing a distance from the first time instant by multiplying a selected length by the value of the time index, the selected length being the uplink symbol length when the uplink symbol length exceeds the SSB length and otherwise being the SSB length, wherein the uplink symbol length and the SSB length are equal, or one is an integer multiple of the other;

determining a transmission time as a function of the computed distance; and transmitting a random access preamble at the determined transmission time.

2. The method according to claim 1, wherein determining the transmission time includes adding a per-symbol cyclic prefix length before the multiplying.

3. The method according to claim 1, wherein the system information is transmitted in the SSB.

4. The method according to claim 3, wherein the SSB comprises primary synchronization signals, secondary synchronization signals, and Physical Broadcast Channel signals.

5. The method according to claim 1, wherein the system information is transmitted as remaining system information (RMSI) in a physical downlink shared channel that is transmitted in association with the SSB.

6. The method according to claim 1, wherein determining the transmission time as a function of the computed distance comprises timewise adding the computed distance to the first time instant to determine the transmission time as a forthcoming time instant.

7. The method according to claim 6, further comprising adding a delay term to the computed distance, such that the forthcoming time is offset relative to the first time instance by the sum of the computed distance and the delay term.

8. The method according to claim 7, wherein the delay term equals an integer number of uplink symbol lengths.

9. The method according to claim 7, wherein the delay term is specified in Physical Broadcast Channel signals transmitted by the network.

10. The method according to claim 7, wherein the system information is transmitted as remaining system information (RMSI) in a physical downlink shared channel, and wherein the delay term is specified in the RMSI.

11. The method according to claim 1, wherein the random access preamble is transmitted on a physical random access channel (PRACH).

12. The method according to claim 1, wherein the downlink symbol length corresponds to a first sub-carrier spacing and the uplink symbol length corresponds to a second sub-carrier spacing.

13. The method according to claim 1, wherein, when the SSB length equals or exceeds the uplink symbol length, the time index uniquely identifies the SSB within the burst and wherein computing the distance comprises multiplying the SSB length by the value of the time index, the SSB length being an integer number of downlink symbol lengths.

14. The method according to claim 13, wherein each SSB in the burst is transmitted in a separate beam and, when the uplink symbol length exceeds the SSB length, the time index commonly identifies a subset of two or more SSBs in the burst that are aligned with a corresponding uplink symbol time, and wherein the method includes determining the timewise position of the SSB within the burst based on the time index in combination with a beam index or identifier of the beam in which the SSB was transmitted.

15. A method for enabling random access in a network, the method being performed by a network node, the method comprising:

transmitting a burst of Synchronization Signal Blocks (SSBs), where each SSB in the burst conveys a time index denoting a timewise position of the SSB within the burst, the time index enabling a receiving terminal device to determine a time for transmitting a random access preamble, and where each SSB in the burst has an SSB length defined by a downlink symbol length that differs from an uplink symbol length indicated in system information included in each SSB or transmitted in association with the burst of SSBs;

monitoring for reception of random access preambles from given terminal devices that received one or more of the SSBs in the burst; and setting the values of the time indexes as integer multiples of the uplink symbol length when the uplink symbol length exceeds the SSB length and otherwise setting the values of the time indexes as integer multiples of the SSB length, where the uplink symbol length and the SSB length are equal, or one is an integer multiple of the other.

16. The method according to claim 15, wherein each SSB comprises primary synchronization signals, secondary synchronization signals, and Physical Broadcast Channel signals.

17. The method according to claim 15, wherein the system information is transmitted separately from the burst of SSBs as remaining system information (RMSI) in a physical downlink shared channel.

18. The method according to claim 15, wherein monitoring for the reception of random access preambles comprises monitoring a physical random access channel (PRACH).

19. The method according to claim 15, wherein the downlink symbol length corresponds to a first sub-carrier spacing and the uplink symbol length corresponds to a second sub-carrier spacing.

20. The method according to claim 15, wherein, when the SSB length equals or exceeds the uplink symbol length, the time index is an integer multiple of the SSB length and uniquely identifies the SSB within the burst.

21. The method according to claim 20, wherein each SSB in the burst is transmitted in a separate beam and, when the uplink symbol length exceeds the SSB length, the time index commonly identifies a subset of two or more SSBs in the burst that are aligned with a corresponding uplink symbol time, and wherein the method includes transmitting in each SSB a beam index or identifier of the beam in which the SSB was transmitted, to thereby enable a receiving terminal device to determine the timewise position of the SSB within the burst.

22. A terminal device configured for performing random access in a network, the terminal device comprising:

transceiver circuitry configured for wirelessly communicating with one or more nodes in the network; and processing circuitry operatively associated with the transceiver circuitry and configured to cause the terminal device to:

receive a Synchronization Signal Block (SSB) at a first time instant, the SSB having a time index denoting a timewise position of the SSB within a burst of successively transmitted SSBs and having an SSB length defined by a downlink symbol length that differs from an uplink symbol length indicated in system information included in or transmitted in association with the SSB, wherein the time index is an integer value;

compute a distance from the first time instant by multiplying a selected length by the value of the time index, the selected length being the uplink symbol length when the uplink symbol length exceeds the SSB length and otherwise being the SSB length, wherein the uplink symbol length and the SSB length are equal, or one is an integer multiple of the other;

determine a transmission time as a function of the computed distance; and transmit a random access preamble at the determined transmission time.

23. A network node configured for enabling random access in a network, the network node comprising:
transceiver circuitry configured for wirelessly communicating with a terminal device operating in the network; and
processing circuitry operatively associated with the transceiver circuitry and configured to cause the network node to:
transmit a burst of Synchronization Signal Blocks (SSBs), where each SSB in the burst conveys a time index denoting a timewise position of the SSB within the burst, the time index enabling a receiving terminal device to determine a time for transmitting a random access preamble, and where each SSB in the burst has an SSB length defined by a downlink symbol length that differs from an uplink symbol length indicated in system information included in each SSB or transmitted in association with the burst of SSBs;
monitor for reception of random access preambles from given terminal devices that received one or more of the SSBs in the burst; and
set the values of the time indexes as integer multiples of the uplink symbol length when the uplink symbol length exceeds the SSB length and otherwise setting the values of the time indexes as integer multiples of the SSB length, where the uplink symbol length and the SSB length are equal, or one is an integer multiple of the other.

24. A non-transitory computer readable medium storing a computer program for performing random access in a network, the computer program comprising computer code which, when run on processing circuitry of a terminal device, causes the terminal device to:
receive a Synchronization Signal Block (SSB) at a first time instant, the SSB having a time index denoting a timewise position of the SSB within a burst of successively transmitted SSBs and having an SSB length defined by a downlink symbol length that differs from an uplink symbol length indicated in system information included in or transmitted in association with the SSB, wherein the time index is an integer value;
compute a distance from the first time instant by multiplying a selected length by the value of the time index, the selected length being the uplink symbol length when the uplink symbol length exceeds the SSB length and otherwise being the SSB length, wherein the uplink symbol length and the SSB length are equal, or one is an integer multiple of the other;
determine a transmission time as a function of the computed distance; and
transmit a random access preamble at the determined transmission time.

25. A non-transitory computer readable medium storing a computer program for enabling random access in a network, the computer program comprising computer code which, when run on processing circuitry of a network node, causes the network node to:
transmit a burst of Synchronization Signal Blocks (SSBs), where each SSB in the burst conveys a time index denoting a timewise position of the SSB within the burst, the time index enabling a receiving terminal device to determine a time for transmitting a random access preamble, and where each SSB in the burst has an SSB length defined by a downlink symbol length that differs from an uplink symbol length indicated in system information included in each SSB or transmitted in association with the burst of SSBs;
monitor for reception of random access preambles from given terminal devices that received one or more of the SSBs in the burst; and
set the values of the time indexes as integer multiples of the uplink symbol length when the uplink symbol length exceeds the SSB length and otherwise setting the values of the time indexes as integer multiples of the SSB length, where the uplink symbol length and the SSB length are equal, or one is an integer multiple of the other.

* * * * *